United States Patent
Bozsak et al.

(10) Patent No.: US 11,623,412 B2
(45) Date of Patent: *Apr. 11, 2023

(54) PROCESS FOR MANUFACTURING THERMOPLASTIC POLYMER COMPOSITE PARTS, AND OBJECT OBTAINED BY SAID PROCESS

(71) Applicant: Arkema France, Colombes (FR)

(72) Inventors: Virginia Bozsak, Versailles (FR); Guillaume R. Cledat, Marcq en Baroeul (FR); Pierre Gerard, Denguin (FR); Michel Glotin, Saint-Cloud (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/492,626

(22) PCT Filed: Mar. 13, 2018

(86) PCT No.: PCT/FR2018/050591
§ 371 (c)(1),
(2) Date: Sep. 10, 2019

(87) PCT Pub. No.: WO2018/172657
PCT Pub. Date: Sep. 27, 2018

(65) Prior Publication Data
US 2020/0047427 A1    Feb. 13, 2020

(30) Foreign Application Priority Data
Mar. 13, 2017 (FR) .................. FR17.52046

(51) Int. Cl.
B29C 65/00    (2006.01)
B29C 65/02    (2006.01)
(Continued)

(52) U.S. Cl.
CPC ........ B29C 66/73921 (2013.01); B29C 65/02 (2013.01); B29C 65/4835 (2013.01);
(Continued)

(58) Field of Classification Search
CPC .......... B29C 65/34–3696; B29C 65/02; B29C 65/4835; B29C 66/73921; B29C 66/1122;
(Continued)

(56) References Cited

U.S. PATENT DOCUMENTS

| | | | |
|---|---|---|---|
| 2008/0156411 A1* | 7/2008 | Manicke | ........... B29C 66/73921 156/73.5 |
| 2009/0098369 A1 | 4/2009 | Manicke et al. | |

(Continued)

FOREIGN PATENT DOCUMENTS

| | | |
|---|---|---|
| CN | 105694440 A | 6/2016 |
| EP | 3112130 B1 | 2/2018 |

(Continued)

OTHER PUBLICATIONS

"A Review of the Properties and Applications of Poly (Methyl Methacrylate) (PMMA)", Polymer Reviews, 2015.*

(Continued)

*Primary Examiner* — John L Goff, II
(74) *Attorney, Agent, or Firm* — Buchanan Ingersoll & Rooney P.C.

(57) ABSTRACT

The invention relates to a process (100) for manufacturing an object (1) made of thermoplastic polymer composite from at least two parts (10) made of thermoplastic polymer composite, said thermoplastic polymer composite comprising a fibrous reinforcement and a thermoplastic polymer matrix, said process comprising the steps of:

Figure 1:
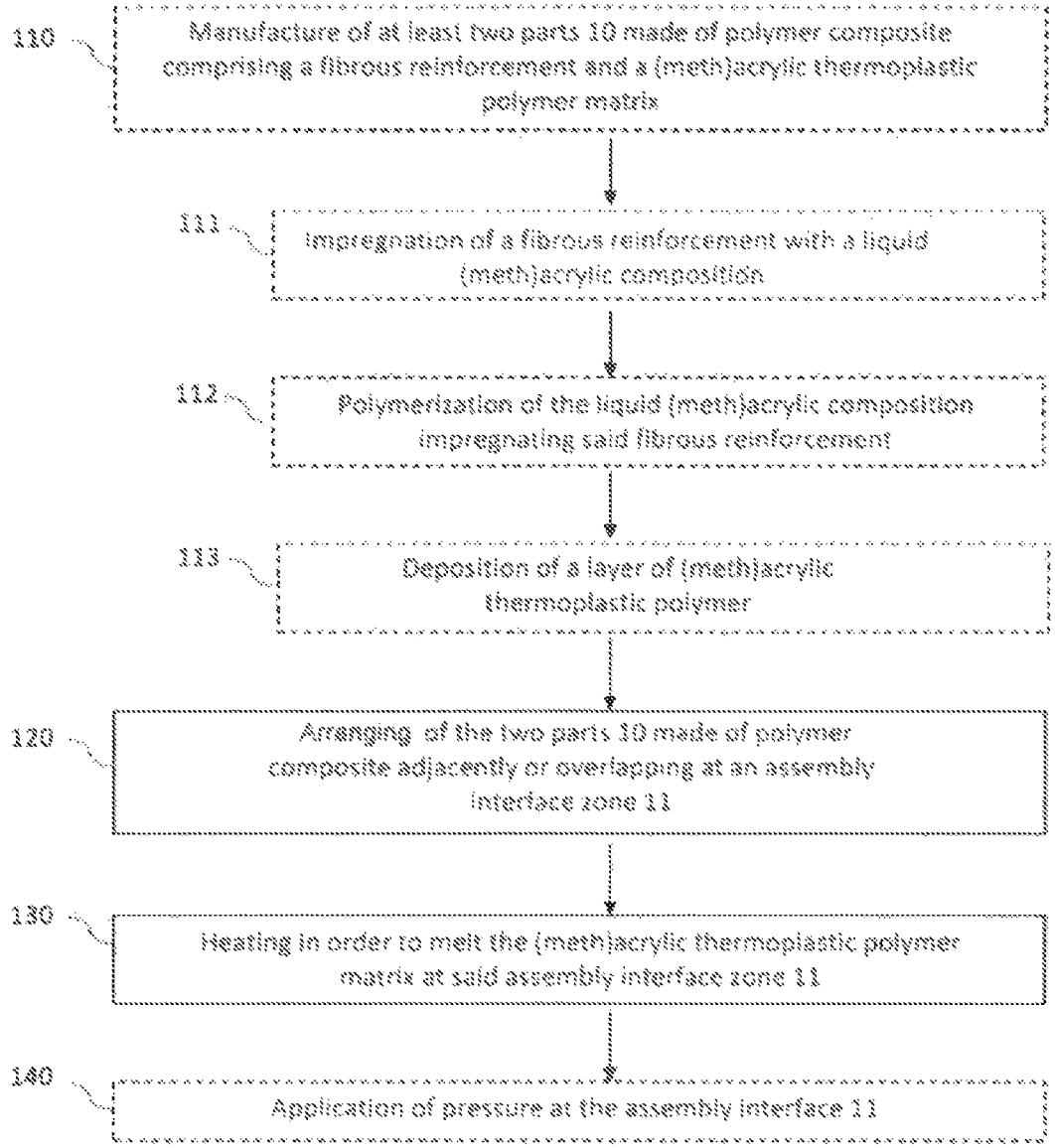

arranging (120) the two parts (10) made of thermoplastic polymer composite adjacently or overlapping at an assembly interface zone (11), and (Continued)

heating (130) to melt the thermoplastic polymer matrix at said assembly interface zone (11), so as to form an object (1) made of thermoplastic polymer composite comprising a welded interface (12).

19 Claims, 5 Drawing Sheets

(51) Int. Cl.
  *B29C 65/48* (2006.01)
  *B29K 33/00* (2006.01)
  *B29L 31/30* (2006.01)

(52) U.S. Cl.
  CPC .......... *B29C 66/114* (2013.01); *B29C 66/116* (2013.01); *B29C 66/1122* (2013.01); *B29C 66/71* (2013.01); *B29C 66/721* (2013.01); *B29C 66/73117* (2013.01); *B29C 66/919* (2013.01); *B29K 2033/12* (2013.01); *B29L 2031/30* (2013.01)

(58) Field of Classification Search
  CPC ..... B29C 66/114; B29C 66/116; B29C 66/71; B29C 66/721; B29C 66/73117; B29C 66/919; B29K 2033/12
  See application file for complete search history.

(56) References Cited

U.S. PATENT DOCUMENTS

| | | |
|---|---|---|
| 2013/0039001 A1 | 2/2013 | Jau et al. |
| 2014/0154494 A1 | 6/2014 | Kato et al. |
| 2014/0286697 A1 | 9/2014 | Takeuchi et al. |
| 2014/0356053 A1 | 12/2014 | Urayama |
| 2015/0013898 A1 | 1/2015 | Kato |
| 2015/0218362 A1* | 8/2015 | Gerard ................. C08F 265/06 524/257 |
| 2015/0246480 A1 | 9/2015 | Sano |
| 2016/0046067 A1 | 2/2016 | Mizutani et al. |
| 2016/0075080 A1 | 3/2016 | Iwano |
| 2016/0177988 A1* | 6/2016 | Silvanos ............. B29C 66/7212 403/270 |
| 2018/0063895 A1* | 3/2018 | Van Tooren ........... H05B 6/105 |

FOREIGN PATENT DOCUMENTS

| | | |
|---|---|---|
| JP | 11090986 A | 4/1999 |
| JP | 2001301039 A | 10/2001 |
| JP | 5307390 B2 | 10/2013 |
| JP | 2013233729 A | 11/2013 |
| JP | 2014076565 A | 5/2014 |
| WO | WO-2013056845 A2 * | 4/2013 ............ C08F 265/06 |

OTHER PUBLICATIONS

"Unfilled Polyethersolfone (PES)", polymerdatabase.com as captured by archive.org, May 2016.*
1. Wachtler et al: Friction Stir Welding von faserverstarken Polymeren—Friction Stir Welding of fibre-reinforced polymers, thesis 1 Janvier 2010 (Jan. 1, 2010), pp. 1-184 p. VII, pp. 26-27, alinea 3.2.8; figure 31; tableau 7, pp. 133-134.
2. Campbell F. C. ED—Campbell Flake C: "Manufacturing processes for advanced composites, Chapter 10 (Thermoplastic Composites: An Unfulfilled Promise)", 1 janvier 2004 (Jan. 1, 2004), Manufacturing Processes for Advanced Technology, Oxford, GB, pp. 1-41.
Second Office Action dated Dec. 14, 2021, issued in the corresponding Chinese Patent Application No. 201880031414.7, 15 pages including 9 pages of English Translation.
Notification of Reason for Refusal dated Dec. 17, 2021, issued in the corresponding Korean Patent Application No. 10-2019-7029213, only 7 pages of English Translation.

* cited by examiner

PROCESS FOR MANUFACTURING THERMOPLASTIC POLYMER COMPOSITE PARTS, AND OBJECT OBTAINED BY SAID PROCESS

This application claims benefit, under U.S.C. § 119 or § 365 of PCT Application Number PCT/FR2018/050591, filed Mar. 13, 2018, and French Patent Application Number FR1752046, filed Mar. 13, 2017, these documents being incorporated herein by reference.

The invention belongs to the field of objects made of thermoplastic polymer composite. More particularly, the invention relates to a process for manufacturing parts made of polymer composite comprising a thermoplastic polymer matrix. The invention also relates to an object made of thermoplastic polymer composite, in particular resulting from such a process.

PRIOR ART

Objects based on polymer composite, comprising a fibrous reinforcement held in a rigid polymer matrix, are increasingly used in all fields, especially the building, automotive, aeronautics and aerospace fields. This is because these fiber-reinforced polymer composites have a high strength/weight ratio and desirable mechanical properties which make them increasingly popular for the manufacture of objects such as skins, stiffeners, cross-members, bodies in white, profiled elements, nacelles, doors, tail vanes, fins, spoilers or flaps.

The polymers used for the production of these objects are often thermosetting polymers and the techniques for producing these objects generally include the production of several parts to he assembled by processes of low-pressure injection, impregnation, infusion molding, vacuum-assisted resin infusion (VARI), pultrusion, vacuum infusion molding, pressurized infusion molding, resin transfer molding and variants thereof, or molding of prepregs.

Various techniques are used to assemble these parts made of polymer composite. These attachment techniques mainly include mechanical fastening and adhesive bonding (adhesives). Rivet assemblies are relatively expensive (e.g. in terms of labor) and complex to implement, and the rivets used increase the overall weight. Adhesive bonds (e.g. epoxy or polyester or polyurethane adhesives) are also expensive and complex because they require special preparation of the surfaces to be adhesively bonded together and generally the implementation of particular curing and/or equipment. Moreover, in addition to non-optimal attachment means, these thermosetting polymer composites are not recyclable.

In order to respond to these problems, the production of parts made of thermoplastic materials, which can be assembled by welding techniques, has been proposed. In welding, the temperature of the parts to be assembled is raised above the melting or softening point of the polymer matrix, the parts are placed in the assembly position until the resin is cooled to obtain mechanical bonding of the assembled area.

Thus, objects made of thermoplastic polymer have been developed. They are generally recyclable and can be attached by welding techniques. Nevertheless, these objects made of thermoplastic polymer are formed by methods that are not compatible with the machines developed for objects made of thermosetting polymer composite. In addition, such systems require employing high temperatures (generally greater than 100° C.) for the creation of the parts to be assembled. This constraint is particularly limiting for the production of large-sized parts.

Consequently, there is a need for a process for manufacturing objects made of thermoplastic polymer composite capable of responding to the problems caused by existing methods, that is easy to implement and does not require high temperature for the manufacture of the parts constituting the object made of thermoplastic polymer composite.

TECHNICAL PROBLEM

The invention therefore aims to overcome the disadvantages of the prior art. In particular, an aim of the invention is to provide a process for manufacturing parts made of thermoplastic polymer composite more quickly than existing processes and also enabling quick and easy assembly, repair or adjustments.

Another aim of the invention is to provide an object made of thermoplastic polymer composite, which can be manufactured more quickly than conventional objects made of thermosetting polymer composite while preferably being predominantly recyclable and resistant to the mechanical and chemical stresses to which the object may be subject during use thereof.

BRIEF DESCRIPTION OF THE INVENTION

To this end, the invention relates to a process for manufacturing an object made of thermoplastic polymer composite from at least two parts made of thermoplastic polymer composite, said thermoplastic polymer composite comprising a fibrous reinforcement and a thermoplastic polymer matrix, said process comprising the steps of:
  arranging the two parts made of thermoplastic polymer composite adjacently or overlapping at an assembly interface zone, and
  heating to melt the thermoplastic polymer matrix at said assembly interface zone, so as to form an object made of thermoplastic polymer composite comprising a welded interface.

Indeed, the use of thermoplastic polymer composite comprising a (meth)acrylic thermoplastic polymer makes it possible to reduce the cycle times compared in particular to the thermosetting polymers conventionally used. Thus, it enables a saving in production time compared to conventional processes using thermosetting polymers.

Moreover, the object made of thermoplastic polymer composite obtained from the manufacturing process according to the invention is easily recyclable, unlike the objects made of thermosetting polymer composite usually used in these fields. Finally, the presence of a welded interface affords the possibility, via a rise in temperature of the interface, to produce assemblies, carry out positioning adjustments of the parts or else repairs without requiring a particular installation.

According to other optional characteristics of the process:
  the at least two parts made of thermoplastic polymer composite are parts made of (meth)acrylic thermoplastic polymer composite. In addition, the process preferably comprises a prior step of manufacturing at least two parts made of (meth)acrylic thermoplastic polymer composite, comprising a fibrous reinforcement and a (meth)acrylic thermoplastic polymer matrix. Indeed, in the context of the use of (meth)acrylic thermoplastic polymer composite, the manufacturing process according to the invention can be implemented using thermoplastic polymer composite parts manufactured with the currently most commonly used industrial equipment (e.g. low-pressure injection molding, infusion molding) and therefore, unlike parts made of thermoplastic polymer composite such as polyamides, does not require modifying the industrial equipment currently used in the various fields of application of the invention. Thus, in this embodiment, the manufacturing process according to the invention, unlike a process using conventional thermoplastic polymers (e.g. polyamides), does not comprise a rise to high temperatures (e.g. >200° C.) over all the parts and thus enables the easy assembly of parts having large dimensions.

The fibrous reinforcement comprises fibers selected from carbon fibers or glass fibers or basalt fibers or polymer-based fibers or plant fibers, alone or in a mixture.

The fibrous reinforcement is based on fibers having an aspect ratio of at least 1000. Such an aspect ratio makes it possible to obtain objects made of thermoplastic polymer composite having improved mechanical properties.

The step of manufacturing at least two parts made of thermoplastic polymer composite comprises the following sub-steps:
impregnation of a fibrous reinforcement with a liquid (meth)acrylic composition,
polymerization of the liquid (meth)acrylic composition.

The manufacturing process further comprises a step of applying pressure at the assembly interface. This makes it possible to weld the at least two parts made of thermoplastic polymer composite together with a reinforced welded interface.

The (meth)acrylic thermoplastic polymer is selected from (meth)acrylic thermoplastic polymers obtained from a liquid (meth)acrylic composition commonly referred to as "syrup" or thermoplastic polymer resin. This liquid (meth)acrylic composition is used to impregnate the fibrous reinforcement, then is polymerized. After polymerization, it constitutes the matrix of the polymer composite. The polymerization is carried out rapidly (e.g. between 30 seconds and 3 hours) with good conversion in order to increase productivity. A liquid composition or a syrup comprising a (meth)acrylic monomer and a precursor (meth)acrylic polymer is described in WO 2013/056845 and WO 2014/013028. For example, the precursor (meth)acrylic thermoplastic polymer is selected from poly(methyl methacrylate) (PMMA) or copolymers of methyl methacrylate (MMA), or mixtures thereof. Preferably, the precursor (meth)acrylic thermoplastic polymer may be chosen from a homopolymer of methyl methacrylate (MMA) or a copolymer comprising at least 50%, preferably at least 70%, more preferably at least 80%, advantageously at least 90% and more advantageously at least 95% by weight of methyl methacrylate. The (meth)acrylic polymers obtained, for example poly(methyl methacrylate) (PMMA) or copolymers of methyl methacrylate (MMA), or the mixtures thereof, are particularly suitable for existing industrial processes for manufacturing objects made of polymer composite and confer satisfactory mechanical and chemical properties on the objects made of polymer composite.

The (meth)acrylic thermoplastic polymer has a glass transition temperature (Tg) of between 50° C. and 160° C., preferably of between 70° C. and 140° C., and even more preferably 90° C. and 120° C. In addition, the (meth)acrylic thermoplastic polymer or a portion of the (meth)acrylic thermoplastic polymer has a melt flow index (MFI) according to ISO 1133 (230° C./3.8 kg) of less than 20 g/10 min. Preferably, the melt flow index is less than 18 g/10 min, more preferably less than 16 g/10 min, advantageously less than 13 g/10 min. This makes it possible to facilitate the production of the object made of polymer composite and also paves the way for easy assembly, adjustment or repair.

The (meth)acrylic thermoplastic polymer matrix also comprises one or more additives or fillers. All the optional additives and fillers are added to the liquid (meth)acrylic syrup before the impregnation and/or the polymerization. As additives, mention may be made of organic additives such as impact modifiers or block copolymers, thermal stabilizers, UV stabilizers, lubricants and mixtures thereof. The impact modifier is in the form of fine particles having an elastomeric core and at least one thermoplastic shell, the size of the particles being generally less than 1 μm and advantageously from 50 to 300 nm. The impact modifier is preferably prepared by emulsion polymerization. The proportion of impact modifiers in the thermoplastic polymer matrix is 0 to 50%, preferably 0 to 25%, and advantageously 0 to 20% by weight. As fillers, mention may be made of carbon nanotubes or mineral fillers including mineral nanofillers ($TiO_2$, silica).

The parts made of thermoplastic polymer composite are manufactured at a temperature of less than 150° C., preferably less than 120° C., even more preferably less than 100° C. Indeed, the liquid (meth)acrylic composition used during the manufacture of the parts made of polymer composite is liquid at a temperature well below the conventional melting points of conventional thermoplastics. Thus, this makes it possible to produce parts made of thermoplastic polymer composite which are of very large dimensions without having to implement processes in which said parts are heated to high temperatures.

The parts made of thermoplastic polymer composite are manufactured by low-pressure injection molding, infusion molding or by molding strips pre-impregnated with (meth)acrylic thermoplastic polymer composite.

At least one of the two parts made of thermoplastic polymer composite comprises a layer of (meth)acrylic thermoplastic polymers at least 0.5 mm, preferably 1 mm, more preferably at least 2 mm thick, on the surface intended to be welded. This makes it possible in particular to avoid the appearance of zones with a lower concentration of resin at a welded interface, which could lead to embrittlement of the object made of thermoplastic polymer composite.

During the heating step, the temperature at the assembly interface is between 160 and 300° C., preferably between 200 and 250° C.

The thermoplastic polymer matrix, preferably (meth)acrylic thermoplastic polymer matrix, is melted by a technique selected from: ultrasonic welding, induction welding, resistance wire welding, friction stir welding, laser welding, heating by infrared or ultraviolet radiation, preferably by resistance wire welding.

At least one of the two parts made of thermoplastic polymer composite comprises at least one resistive filament located at the assembly interface.

The invention further relates to an object made of thermoplastic polymer composite manufactured from at least two parts made of thermoplastic polymer composite, characterized in that said thermoplastic polymer composite comprises a fibrous reinforcement and a thermoplastic polymer matrix, preferably a (meth)acrylic thermoplastic polymer matrix, and in that the at least two parts made of thermoplastic polymer composite are connected by a welded interface.

According to other optional characteristics of the object:

the object made of thermoplastic polymer composite does not comprise more than 50%, preferably not more than 40%, more preferably not more than 30%, even more preferably not more than 20%, more advantageously not more than 15% by weight and even more advantageously not more than 10% by weight of thermosetting polymers such as an epoxy resin. Thus, the object made of thermoplastic polymer composite according to the invention has a very significant gain in terms of production time and an increased capacity to be recycled. Likewise, the object made of thermoplastic polymer composite does not comprise more than 10% by weight, preferably not more than 8% by weight, advantageously not more than 7% by weight, more advantageously not more than 6% by weight and even more advantageously not more than 5% by weight of adhesives, preferably thermosetting adhesives.

The object made of thermoplastic polymer composite is selected from: a coating consisting of a plurality of panels, a railing, a window profile, an aircraft fuselage, reinforcements for construction, a cross-member (especially for a vehicle), a body in white part, a nacelle, a tail vane, a fin, a spoiler, a flap, a marine turbine blade, a hull, a bridge, a bulkhead for boats, and trims (hoods) for cars.

Other advantages and features of the invention will become apparent on reading the following description given by way of illustrative and non-limiting example, with reference to the appended figures, which depict:

FIG. 1: a flow chart of a preferred embodiment of a manufacturing process according to the invention. The steps with dashed lines are optional.

FIGS. 2A to 2E: schematic sectional views of assemblies of parts made of thermoplastic polymer composite.

Figure 3A:
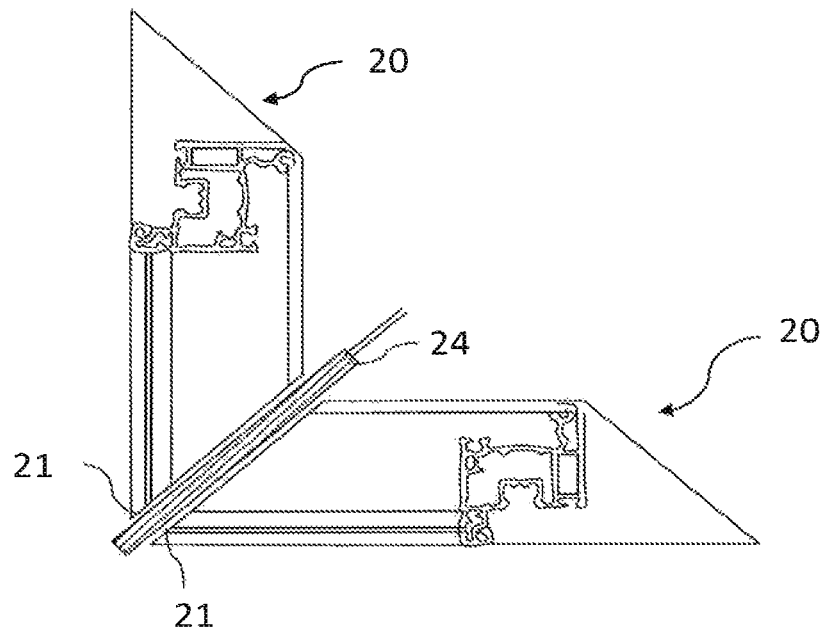
Figure 3B:
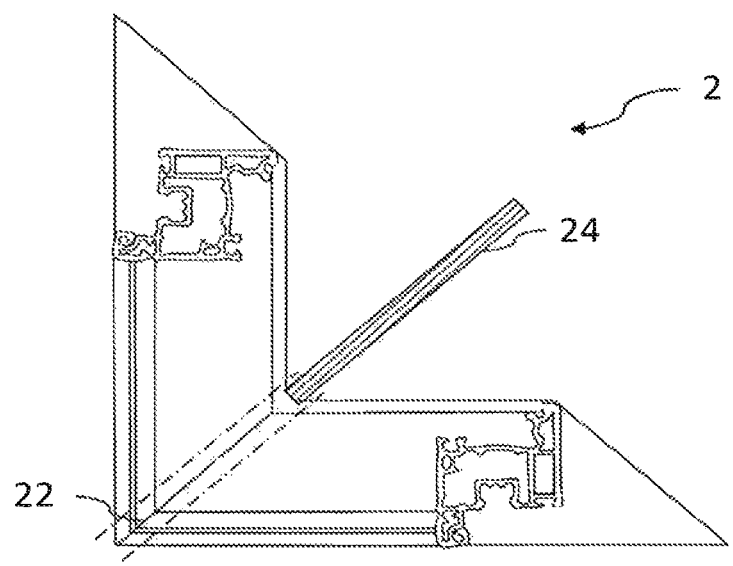

FIGS. 3A and 3B: two simplified illustrations in top view of a longitudinal section of two parts of a window profile assembled according to the process according to the invention.

Figure 4A:
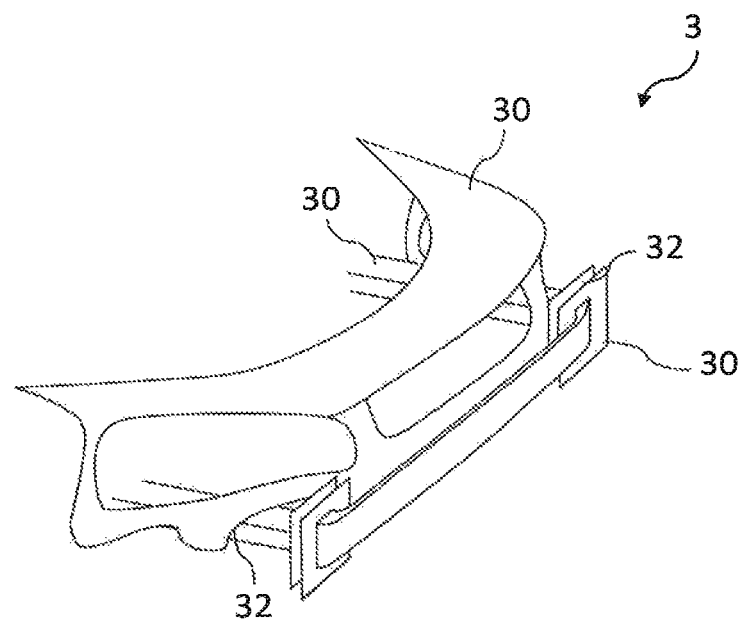
Figure 4B:
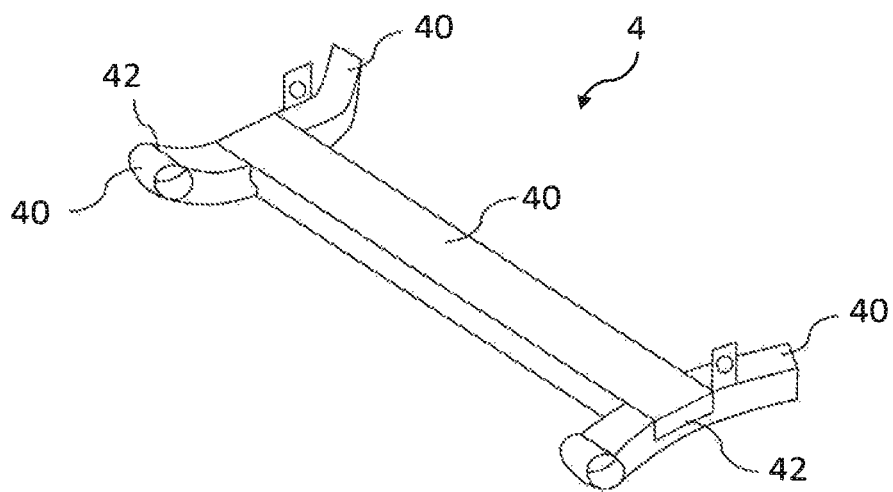

FIGS. 4A and 4B: a schematic perspective view of vehicle cross-members according to the invention.

Figure 5:
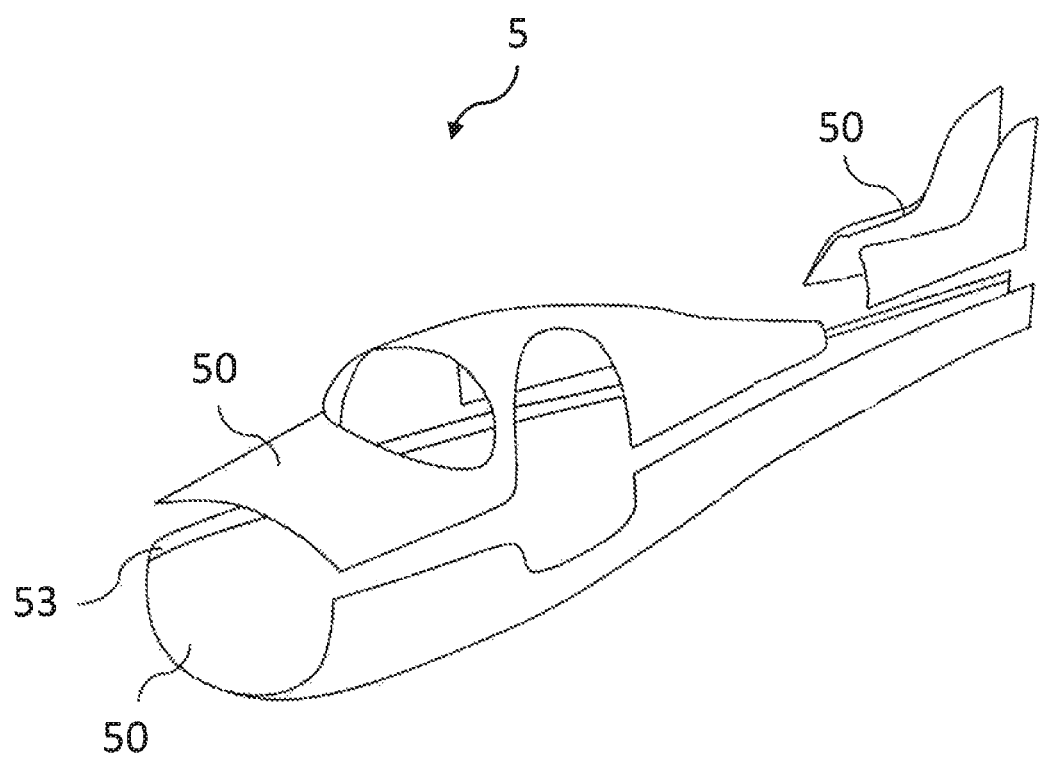

FIG. 5: a schematic perspective view of an aircraft fuselage portion according to the invention.

DESCRIPTION OF THE INVENTION

In the remainder of the description, the "welded interface" corresponds to the welded join between parts, or portions of parts. It refers to the melted zone, that is to say the zone of thermoplastic polymer which has gone into the liquid state during the welding operation. The welding according to the invention can be carried out with or without providing thermoplastic filler material, especially (meth)acrylic thermoplastic filler material.

For the purposes of the invention, the term "resistive filament" means a filament comprising a material having a resistivity greater than $1 \times 10^{-2} \Omega$ mm$^2$/m at 20° C., for example greater than 0.1$\Omega$ mm$^2$/m at 20° C. The resistive filament may for example comprise metal or a metal alloy or any other organic conductive elements based on carbon such as a conductive polymeric film or wire based on carbon black, carbon nanotubes, graphenes. Preferably, the resistive filament has a high melting point, greater than the softening point or pour point (e.g. glass transition temperature) of the (meth)acrylic thermoplastic polymer according to the invention. The melting point of the resistive filament is preferably greater than 300° C., more preferably greater than 500° C., for example greater than 750° C. In the case of a conductive polymeric film or wire, it must have a pour point at least equal to that of the thermoplastic polymer, preferably (meth)acrylic thermoplastic polymer.

For the purposes of the invention, the expression "polymer composite" denotes a multi-component material comprising at least two immiscible components, in which at least one component is a polymer and the other component may for example be a fibrous reinforcement.

For the purposes of the invention, "fibrous reinforcement" or "fibrous substrate" mean a plurality of fibers, unidirectional rovings or a continuous filament mat, fabrics, felts or nonwovens which may be in the form of strips, webs, braids, strands or parts.

"Matrix" means a material serving as binder which is capable of transferring forces to the fibrous reinforcement. The "polymer matrix" comprises polymers but may also comprise other compounds or materials. Thus, the "(meth)acrylic polymer matrix" refers to any type of compounds, polymers, oligomers, copolymers or block copolymers, both acrylic and methacrylic. However, it would not be departing from the scope of the invention if the (meth)acrylic polymer matrix comprised up to 10% by weight, preferably less than 5% by weight, of other nonacrylic monomers chosen for example from the group: butadiene, isoprene, styrene, substituted styrene, such as α-methylstyrene or tert-butylstyrene, cyclosiloxanes, vinylnaphthalenes and vinylpyridines.

"Polymer" means either a copolymer or a homopolymer. "Copolymer" means a polymer grouping together several different monomer units and "homopolymer" means a polymer grouping together identical monomer units. "Block copolymer" means a polymer comprising one or more uninterrupted sequences of each of the separate polymer entities, the polymer sequences being chemically different from one another and being bonded to one another by a covalent bond. These polymer sequences are also known as polymer blocks.

For the purposes of the invention, the term "radical initiator", denotes a compound that can start/initiate the polymerization of a monomer or monomers.

For the purposes of the invention, the term "polymerization" denotes the process of conversion of a monomer or of a mixture of monomers into a polymer.

For the purposes of the invention, the term "monomer" denotes a molecule which may undergo a polymerization.

For the purposes of the invention, "thermoplastic polymer" means a material that is generally solid at room temperature, which may be crystalline, semicrystalline or amorphous, and which softens during an increase in temperature, in particular after passing its glass transition temperature (Tg) and flows at higher temperature and that may exhibit obvious melting on passing its melting point (Tm) (when it is semicrystalline) and which becomes solid again during a reduction in temperature below its melting point and below its glass transition temperature. This also applies to thermoplastic polymers slightly crosslinked by the presence of multifunctional monomers or oligomers in the formulation of the (meth)acrylate "syrup", in weight percentage preferably of less than 10%, preferably less than 5%, and more preferably less than 2%, for instance crosslinking agents at a percentage by weight of less than 1%, or less than 0.5%, which can be thermoformed when heated above the softening point.

For the purposes of the invention, "thermosetting polymer" means a plastic material which is irreversibly transformed by polymerization into an insoluble polymer network, A "(meth)acrylic monomer" means any type of acrylic and methacrylic monomer.

A "(meth)acrylic polymer" means a polymer essentially comprising (meth)acrylic monomers, which represent at least 50% by weight or more of the (meth)acrylic polymer.

For the purposes of the invention, the term "PMMA" denotes homo- and copolymers of methyl methacrylate (MMA), the weight ratio of MMA in the PMMA preferably being at least 70% by weight for the MMA copolymer, In the remainder of the description, the same references are used to indicate the same elements.

According to a first aspect, the invention relates to a process 100 for manufacturing an object 1 made of thermoplastic polymer composite from at least two parts made of thermoplastic polymer composite, said thermoplastic polymer composite comprising a fibrous reinforcement and a thermoplastic polymer matrix, as depicted in FIG. 1. Preferably, the process is carried out starting from at least two parts made of (meth)acrylic thermoplastic polymer composite, said (meth)acrylic thermoplastic polymer composite comprising a fibrous reinforcement and a (meth)acrylic thermoplastic polymer matrix.

This process mainly comprises the following steps:
arranging 120 the two parts 10 made of thermoplastic polymer composite adjacently or overlapping at an assembly interface zone 11, and
heating 130 to melt the thermoplastic polymer matrix at said assembly interface zone 11, so as to form an object 1 made of thermoplastic polymer composite comprising a welded interface 12.

The (meth)acrylic thermoplastic polymers forming part of the matrix associated with the fibrous reinforcement may be chosen from polymers and copolymers of the family of acrylics, such as polyacrylates. They are more particularly selected from polymethyl methacrylate (PMMA) or derivatives thereof or copolymers of methyl methacrylate (MMA) or mixtures thereof.

Preferably, the (meth)acrylic thermoplastic polymer, forming the (meth)acrylic thermoplastic polymer matrix, has a glass transition temperature (Tg) of between 50° C. and 160° C., preferably between 70° C. and 140° C., and even more preferably 90° C. and 120° C., which is advantageous compared to other thermoplastic polymers such as polyamines. Indeed, polyamines generally have very high melting points, namely from 200° C. and higher, which does not facilitate on-site assembly as is the case according to the process of the invention. Glass transition temperatures or melting points can be measured by methods well known to those skilled in the art. Preferably, these temperatures are measured by Differential Scanning Calorimetry according to the conditions specified in standards ISO 11357-2/2013 for Tg and ISO 11357-3/2011 for Tm. In addition, the (meth)acrylic thermoplastic polymer or a portion of the (meth)acrylic thermoplastic polymer has a melt flow index (MFI) according to ISO 1133 (230° C./3.8 kg) of less than 20 g/10 min. Preferably, the melt flow index is less than 18 g/10 min, more preferably less than 16 g/10 min, advantageously between 0.1 g and 13 g/10 min.

As will be detailed below, the (meth)acrylic thermoplastic polymer matrix can be obtained from the polymerization of a liquid (meth)acrylic composition comprising a (meth)acrylic monomer or a mixture of (meth)acrylic monomers, a (meth)acrylic polymer and at least one radical initiator.

The (meth)acrylic thermoplastic polymer matrix is formed of (meth)acrylic thermoplastic polymers but it may further comprise one or more additives and/or one or more fillers.

The carbonaceous fillers may in particular be activated carbon, natural anthracite, synthetic anthracite, carbon black, natural graphite, synthetic graphite, carbonaceous nanofillers or mixtures thereof. They are preferably chosen from carbonaceous nanofillers, in particular graphenes and/or carbon nanotubes and/or carbon nanofibrils or mixtures thereof. These fillers make it possible to conduct electricity and heat, and consequently make it possible to improve the lubrication of the polymer matrix when it is heated. They may then enable an increased reduction in cycle times or facilitate assembly, adjustment or repair at the installation site.

The mineral fillers include in particular metal hydroxides, which are more particularly in the form of alumina trihydrate ($Al(OH)_3$) or magnesium hydroxide ($Mg(OH)$) and mineral nanofillers such as calcium carbonate, titanium dioxide or silica.

As additives, mention may be made of organic additives such as impact strength modifiers or block copolymers, thermal stabilizers, UV stabilizers, lubricants, viscosity modifiers, pH modifiers (sodium hydroxide), particle size modifiers (sodium sulfate), biocides, and mixtures thereof. These additives make it possible to improve in particular the rheological, chemical and adhesion properties of the (meth)acrylic thermoplastic polymer matrix.

The weight percentage of all of the additives and fillers relative to the total weight of (meth)acrylic thermoplastic polymer matrix is preferably less than 30%, preferably less than 10%.

Fibrous reinforcement generally refers to a plurality of fibers, unidirectional rovings or a continuous filament mat, fabrics, felts or nonwovens which may be in the form of strips, webs, braids, strands or parts. More particularly, a fibrous reinforcement comprises an assembly of one or more fibers, generally several fibers, said assembly being able to have different forms and dimensions; one-dimensional, two-dimensional or three-dimensional. The one-dimensional form corresponds to linear long fibers. The fibers may be discontinuous or continuous. The fibers may be arranged randomly or parallel to one another, in the form of a continuous filament. The two-dimensional form corresponds to nonwoven reinforcements or fibrous mats or woven rovings or bundles of fibers, which may also be braided. Even if the two-dimensional form has a certain thickness and consequently in principle a third dimension, it is considered to be two-dimensional according to the present invention. The three-dimensional form corresponds for example to stacked or folded nonwoven fibrous reinforcements or fibrous mats or stacked or folded bundles of fibers or mixtures thereof; an assembly of the two-dimensional form in the third dimension.

The fibers may be discontinuous or continuous. When the fibers are continuous, the assembly thereof forms fabrics. Preferably, the fibrous reinforcement is based on continuous fibers. A fiber is defined by its aspect ratio, which is the ratio between the length and the diameter of the fiber. The fibers used in the present invention are long fibers obtained from continuous fibers, or continuous fibers. The fibers have an aspect ratio of at least 1000, preferably at least 1500, more preferably at least 2000, advantageously at least 3000 and more advantageously at least 5000, even more advantageously at least 6000, even more advantageously at least 7500 and most advantageously at least 10 000,.The continuous fibers have an aspect ratio of at least 1000. The dimensions of a fiber can be measured by methods well known to those skilled in the art, Preferably, these dimensions are measured by microscopy according to standard ISO 137.

The origins of the fibers constituting the fibrous reinforcement may be natural or synthetic. Natural materials that may be mentioned include plant fibers, wood fibers, animal fibers or mineral fibers. Plant fibers are, for example, sisal, jute, hemp, linen, cotton, coconut, and banana fibers. Animal fibers are for example wool or fur. The mineral fibers may also be chosen from glass fibers, in particular of type E, R or S2, basalt fibers, carbon fibers, boron fibers or silica fibers.

Synthetic materials that may be mentioned include polymer fibers selected from thermosetting polymer fibers, thermoplastic polymers or mixtures thereof. The polymer fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

Preferably, the fibrous reinforcement of the present invention comprises plant fibers, wood fibers, animal fibers, mineral fibers, synthetic polymer fibers, glass fibers, basalt fibers and carbon fibers, alone or in a mixture. More preferably, the fibrous reinforcement of the present invention comprises carbon fibers and/or glass fibers. More preferably, the fibrous reinforcement of the present invention essentially consists of natural fibers (plant or wood fibers), carbon fibers or glass fibers.

The fibers of the fibrous reinforcement have for example a diameter of between 0.005 µm and 100 µm, preferably between 1 µm and 50 µm, more preferably between 5 µm and 30 µm and advantageously between 10 µm and 25 µm.

Preferably, the fibers of the fibrous reinforcement of the present invention are selected from continuous fibers for the one-dimensional form, or from long or continuous fibers for the two-dimensional or three-dimensional form of the fibrous reinforcement.

As presented in FIG. 1, a first optional step of manufacturing 110 at least two parts 10 made of (meth)acrylic thermoplastic polymer composite may comprise the following sub-steps:
  impregnation 111 of a fibrous reinforcement with a liquid (meth)acrylic composition,
  polymerization 112 of the liquid (meth)acrylic composition, impregnating said fibrous reinforcement.

One of the advantages of the present invention is that the parts 10 made of thermoplastic polymer composite can be manufactured at a temperature of less than 150° C., preferably less than 140° C., even more preferably less than 125° C., advantageously less than 120° C., more advantageously less than 110° C. and even more advantageously less than 100° C. For example, the step of impregnating the fibrous reinforcement with the liquid (meth)acrylic composition is carried out at a temperature of less than 150° C., preferably less than 120° C., even more preferably less than 100° C. or less than 80° C. Indeed, the liquid (meth)acrylic composition used for the manufacture of the parts 10 made of thermoplastic polymer composite is liquid at a temperature well below the conventional melting points of conventional thermoplastics. Thus, this makes it possible to produce parts 10 made of thermoplastic polymer composite which are of very large dimensions without having to implement processes in which said parts are heated to high temperatures. Thus, it should be understood that the processes that may be used to manufacture these parts do not require a step of heating at a high temperature as could have been the case with a conventional thermoplastic.

The step 110 of manufacturing a part 10 made of thermoplastic polymer composite may also comprise a sub-step 113 of deposition of a layer 13 of (meth)acrylic thermoplastic polymer. This deposition may preferably be at an assembly interface zone intended to form the future welded interface. Alternatively, the deposition is made over the whole part 10 made of thermoplastic polymer composite.

Regarding the step 110 of manufacturing parts 10 made of thermoplastic polymer composite, different processes can be used to manufacture these parts. Mention may be made of vacuum-assisted resin infusion (VARI), pultrusion, vacuum infusion molding, pressurized infusion molding, autoclave molding, resin transfer molding (RTM) and variants thereof such as (HP-RTM, I-RTM), reaction-injection molding (RIM), reinforced reaction-injection molding (R-RIM) and variants thereof, press molding, compression molding, liquid compression molding (LCM) or sheet molding (SMC) or bulk molding (BMC).

A first preferred manufacturing process for manufacturing parts 10 made of thermoplastic polymer composite is a process according to which the liquid (meth)acrylic composition is transferred onto the fibrous reinforcement by impregnation of the fibrous reinforcement in a mold. Processes requiring a mold are listed above and include the word molding.

A second preferred manufacturing process for manufacturing parts 10 made of thermoplastic polymer composite are processes according to which the liquid composition is used in the pultrusion process. The fibers are guided via a batch of resin comprising the composition according to the invention. The fibers in the form of fibrous reinforcement are, for example, in the form of a unidirectional roving or a continuous filament mat. After impregnation in the resin batch, the wet fibers are pulled through a heated die, where the polymerization occurs.

A third preferred manufacturing process is vacuum-assisted resin infusion (VARI).

The process for manufacturing parts 10 made of thermoplastic polymer composite but also mechanical or structured parts or products may further comprise the step of post-forming. Post-forming involves bending and also modifying the shape of the composite part. The process for manufacturing parts 10 made of thermoplastic polymer composite may further comprise a step of rolling.

The thermoplastic parts obtained by the processes according to the invention can be post-formed after polymerization of the liquid composition of the invention. Forming involves bending and also modifying the shape of the composite part.

Regarding the liquid (meth)acrylic composition, it may comprise a (meth)acrylic monomer, a precursor (meth)acrylic polymer and a radical initiator as described in WO2013/056845 and WO2014/013028.

In addition, during the impregnation, while preparing the polymer composite, the viscosity of the liquid (meth)acrylic composition or impregnation syrup must be regulated and adapted so as not to be too fluid or too viscous, in order to correctly impregnate each fiber of the fibrous reinforcement. When the wetting is partial, either because the syrup is too fluid or too viscous, "naked" zones, i.e. non-impregnated zones, and zones in which drops of polymer form on the fibers, which are the cause of bubble formation, respectively, appear. These "naked" zones and these bubbles give rise to the appearance of defects in the part made of polymer composite or the final object made of polymer composite, which are the cause, inter alia, of a loss of mechanical strength of the part made of polymer composite or the final object made of polymer composite. Moreover, in the case of use without impregnation, it is desirable to have a liquid composition which polymerizes rapidly with good conversion, in order to increase productivity.

Thus, said liquid (meth)acrylic composition preferably has a dynamic viscosity of between 10 mPa*s and 10 000 mPa*s at 25° C. The dynamic viscosity of the liquid composition or of the (meth)acrylic syrup is in a range from 10 mPa*s to 10000 mPa*s, preferably from 20 mPa*s to 7000 mPa*s and advantageously from 20 mPa*s to 5000 mPa*s. The viscosity of the liquid (meth)acrylic composition, or liquid (meth)acrylic syrup, can be easily measured with a rheometer or viscometer. The dynamic viscosity is measured at 25° C. If the liquid (meth)acrylic syrup exhibits Newtonian behavior, meaning without shear thinning, the dynamic viscosity is independent of the shearing in a rheometer or the speed of the spindle in a viscometer. If the liquid composition exhibits non-Newtonian behavior, i.e. with shear thinning, the dynamic viscosity is measured at a shear rate of 1 $s^{-1}$ at 25° C.

The liquid (meth)acrylic composition comprises at least one (meth)acrylic monomer or a mixture of (meth)acrylic monomers, a precursor (meth)acrylic polymer.

The (meth)acrylic monomer or the mixture of (meth) acrylic monomers in the liquid (meth)acrylic composition or the liquid (meth)acrylic syrup are present at an amount of at least 40% by weight, preferably of at least 45% by weight, more preferably of at least 50% by weight, advantageously of at least 60% by weight and more advantageously of at least 65% by weight in the liquid (meth)acrylic composition.

The precursor (meth)acrylic polymer in the liquid (meth) acrylic composition or the liquid (meth)acrylic syrup is present at an amount of at least 10% by weight, preferably of at least 15% by weight, advantageously of at least 18% by weight and more advantageously of at least 20% by weight in the liquid (meth)acrylic composition.

The precursor (meth)acrylic polymer in the liquid (meth) acrylic composition or the liquid (meth)acrylic syrup is present at an amount of at most 60% by weight, preferably of at most 50% by weight, advantageously of at most 40% by weight and more advantageously of at most 35% by weight in the liquid (meth)acrylic composition.

The liquid (meth)acrylic composition or the syrup, the syrup compounds are incorporated in the following percentages by weight:
the (meth)acrylic monomer in the liquid composition or the (meth)acrylic syrup are present in proportions of between 40% and 90% by weight and preferably between 45% and 85% by weight of the composition consisting of the (meth)acrylic monomer and the (meth)acrylic polymer,
the (meth)acrylic polymer in the liquid composition or the (meth)acrylic syrup are present in proportions of between 10% and 60% by weight and advantageously between 15% and 55% by weight of the composition consisting of the (meth)acrylic monomer(s) and the (meth)acrylic polymer; preferably, the (meth)acrylic polymer in the liquid composition is present in proportions of between 18% and 30%, more preferably between 20% and 25% by weight of the composition consisting of the (meth)acrylic monomer and the (meth)acrylic polymer.

The (meth)acrylic monomer, the monomer is selected from acrylic acid, methacrylic acid, alkylacrylic monomers, alkylmethacrylic monomers, hydroxyalkylacrylic monomers and hydroxyalkylmethacrylic monomers, and mixtures thereof.

Preferably, the (meth)acrylic monomer is selected from acrylic acid, methacrylic acid, hydroxyalkylacrylic monomers, hydroxyalkylmethacrylic monomers, alkylacrylic monomers, alkylmethacrylic monomers and mixtures thereof, the alkyl group containing 1 to 22 linear, branched or cyclic carbons; the alkyl group preferably containing from 1 to 12 linear, branched or cyclic carbons.

Advantageously, the (meth)acrylic monomer is selected from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth) acrylic monomer is methyl methacrylate.

According to a first more preferred embodiment, at least 50% by weight, preferably at least 60% by weight, more preferably at least 70% by weight, advantageously at least 80% by weight and even more advantageously 90% by weight of the monomer is a mixture of methyl methacrylate with optionally at least one other monomer.

Regarding the precursor (meth)acrylic polymer, mention may be made of polyalkyl methacrylates or polyalkyl acrylates. According to a preferred embodiment, the (meth) acrylic polymer is poly(methyl methacrylate) (PMMA).

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment the PMMA is a mixture of at least one homopolymer and at least one copolymer of MMA, or a mixture of at least two homopolymers or two copolymers of MMA with a different average molecular weight or a mixture of at least two copolymers of MMA having a different composition of monomers.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may particularly be made of acrylic and methacrylic acids and alkyl (meth)acrylates in which the alkyl group contains from 1 to 12 carbon atoms. By way of examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer, containing at least one ethylenic unsaturation, that can copolymerize with the methyl methacrylate. Preferably, the comonomer is chosen from methyl acrylate and ethyl acrylate and mixtures thereof.

The weight-average molecular weight ($M_w$) of the precursor (meth)acrylic polymer should be high, meaning greater than 50 000 g/mol, preferably greater than 100 000 g/mol. The weight-average molecular weight may be measured by size exclusion chromatography.

The precursor (meth)acrylic polymer is fully soluble in the (meth)acrylic monomer or in the mixture of (meth)acrylic monomers. It enables the viscosity of the (meth)acrylic monomer or the mixture of (meth)acrylic monomers to be increased. The liquid composition or solution obtained is generally referred to as "syrup" or "prepolymer". The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C. Advantageously, the liquid (meth)acrylic syrup contains no additional solvent added intentionally.

Regarding the radical initiator, mention may be made of preferably water-soluble radical polymerization initiators or liposoluble or partially liposoluble radical polymerization initiators, The water-soluble radical polymerization initiators are, in particular, sodium, potassium or ammonium persulfates, used alone or in the presence of reducing agents such as sodium metabisulfites or hydrosulfites, sodium thiosulfate, sodium formaldehyde-sulfoxylate, a mixture of disodium salt of 2-hydroxy-2-sulfinoacetic acid, sodium sulfite and disodium salt of 2-hydroxy-2-sulfoacetic acid, or else a mixture of disodium salt of hydroxysulfinoacetic acid and disodium salt of hydroxysulfoacetic acid.

The liposoluble or partially liposoluble radical polymerization initiators are, in particular, peroxides or hydroperoxides and derivatives of azobisisobutyronitrile. The peroxides or hydroperoxides are used in combination with the reducing agents described above so as to lower their activation temperature.

The percentage by weight of initiator relative to the total weight of monomer mixture is preferably between 0.05% by weight and 3% by weight, preferably between 0.1% by weight and 2% by weight.

The step of arranging 120 the two parts 10 made of thermoplastic polymer composite adjacently or overlapping at an assembly interface zone 11 is illustrated in FIG. 2. Thus, FIG. 2A presents two parts 10 made of thermoplastic polymer composite located adjacently and separated by an assembly interface zone 11. The ends of the parts made of thermoplastic polymer composite are located adjacently so as to form the assembly interface zone 11. As presented in FIG. 2B, the ends may be formed by a cross section of the parts 10 made of thermoplastic polymer composite so as to form a transverse welded interface 12.

Figure 2A:
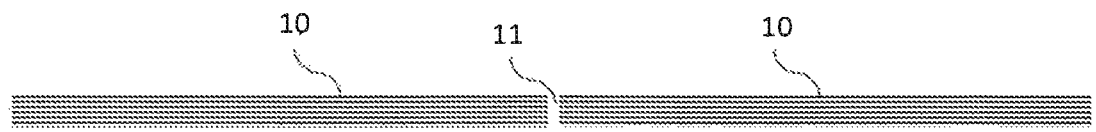
Figure 2B:
Figure 2C:
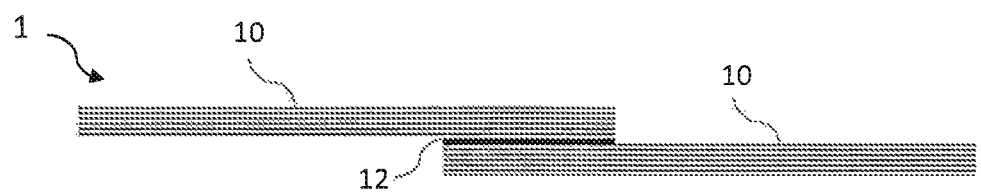
Figure 2D:
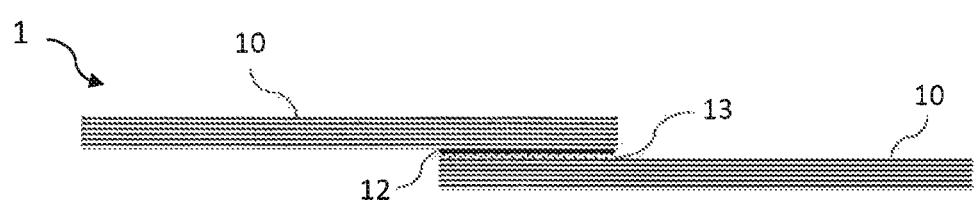
Figure 2E:
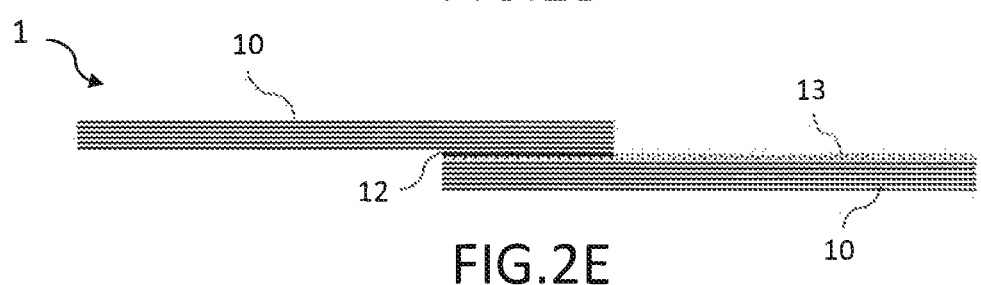

As presented in FIGS. 2C to 2E, the parts 10 made of thermoplastic polymer composite may also be located so as to be overlapping and therefore to create a coverage zone corresponding to the future welded interface 12 as depicted in these figures.

In addition, the parts 10 made of thermoplastic polymer composite may comprise a layer 13 of (meth)acrylic thermoplastic polymer. As mentioned previously, this layer 13 may preferably be located at an assembly interface zone intended to form the future welded interface 12 (FIG. 2D). Alternatively, the deposition of the layer 13 is made over the whole part 10 made of thermoplastic polymer composite, as presented in FIG. 2E. Said deposition makes it possible in particular to obtain a layer 13 of (meth)acrylic thermoplastic polymer at least 0.5 mm thick on the surface intended to be welded.

In particular, the welded or welding interface 12 has a thickness of greater than or equal to 1 mm, preferably greater than or equal to 2 mm. The thickness of the welded interface 12 may be measured by conventional methods, for example from a vertical section of said welded interface 12.

FIGS. 2A to 2E depict merely a sectional view of the welded interface 12 but the latter preferably extends over a large length of the parts 10 made of thermoplastic polymer composite. Thus, the welded interface 12 may have a length of greater than 1 meter, preferably greater than 5 meters and even more preferably greater than 10 meters. In addition, the process according to the invention is particularly well suited to large parts 10 made of thermoplastic polymer composite. Thus, preferably, at least one of the two parts 10 made of thermoplastic polymer composite comprises a dimension of greater than 1 meter, preferably greater than 2 meters.

The heating step 130 makes it possible to melt the (meth)acrylic thermoplastic polymer matrix at said assembly interface zone 11, so as to form an object 1 made of thermoplastic polymer composite comprising a welded interface 12. The (meth)acrylic thermoplastic polymer matrix may be melted by a technique selected from: ultrasonic welding, induction welding, resistance wire welding, friction stir welding, laser welding, heating by infrared or ultraviolet radiation. Preferably, the (meth)acrylic thermoplastic polymer matrix is melted by resistance wire welding.

The welding according to the invention can be carried out with or without providing (meth)acrylic thermoplastic polymer filler material. Indeed, during heating, (meth)acrylic thermoplastic polymer material can be supplied for example in the form of a rod made of (meth)acrylic thermoplastic polymer. This is advantageous when a hollow or an empty space is formed during step 120 of arranging the two parts made of thermoplastic polymer composite. The supply of thermoplastic filler material via the rod made of (meth)acrylic thermoplastic polymer makes it possible to fill any hollows or spaces.

Preferably, during the heating step 230, the temperature at the assembly interface 11 is between 160° C. and 300° C. This temperature can be measured conventionally by infrared thermometer.

FIGS. 3A and 3B depict two simplified illustrations in top view of a longitudinal section of two parts 20 of a window profile assembled according to the process according to the invention. In FIG. 3A, the two parts 20 of a window profile made of thermoplastic polymer composite are separated by a hot plate 24. When the melting point is reached, the hot plate 24 is removed and the two parts 20 of a window profile made of thermoplastic polymer composite are brought into contact (cf. FIG. 3B) with one another so as to form the window profile 2 made of thermoplastic polymer composite comprising a welded interface 22.

The optional step 140 of applying pressure comprises the generation of pressure at the assembly interface 11. This pressure, produced after the heating step 130, makes it possible to reinforce the welded interface between the at least two parts 10 made of polymer composite so as to form an object made of thermoplastic polymer composite comprising a welded interface 12. The two parts 10 made of thermoplastic polymer composite may also be solidly attached together in the desired position or form and held until the thermoplastic polymer matrix has cooled, thereby forming a firm welded interface 12. The pressure may for example be produced by applying a partial air vacuum at the zone for assembly 11 of the at least two parts 10 made of thermoplastic polymer composite. The pressure may also be produced by applying a force substantially perpendicular to the assembly interface zone 11, for example via the deposition of a template on the at least two parts made of thermoplastic polymer composite.

The optional cooling step 150 makes it possible to improve the mechanical properties of the welded interface 12. This cooling step 150 may be carried out at room temperature (e.g. between 15° C. and 25° C.) or else at a temperature below the Tg of the (meth)acrylic thermoplastic polymer.

According to a second aspect, the present invention relates to an object made of thermoplastic polymer composite manufactured from at least two parts 10 made of thermoplastic polymer composite. As mentioned above, the thermoplastic polymer composite comprises a fibrous reinforcement and a (meth)acrylic thermoplastic polymer matrix and the at least two parts 10 made of thermoplastic polymer composite are connected by a welded interface 12. Objects made of thermoplastic polymer composite according to the invention may be used in numerous fields and preferably in the building, aeronautics, nautical, automotive and leisure fields. Thus, the object made of thermoplastic polymer composite according to the invention may preferably be selected from a coating consisting of a plurality of panels, a railing, a window profile, an aircraft fuselage, reinforcements for construction, a cross-member (especially for a vehicle), a body in white part for a vehicle, a nacelle, a tail vane, a fin, a spoiler, a flap, a marine turbine blade, a hull, a bridge, a bulkhead for boats, and trims (hoods) for cars.

In the remainder of the description, three other examples of objects are given.

FIGS. 4A and 4B depict objects 3, 4 made of thermoplastic polymer composite according to the invention. FIG. 4A depicts a cross-member 3 of bumper reinforcement type for a motor vehicle, made of thermoplastic polymer composite according to the invention comprising welding interfaces 32. These parts 30 made of thermoplastic polymer composite form structural elements for a vehicle and are connected by a plurality of welding interfaces 32. The invention is not limited to these particular parts 30 but could also be implemented in the manufacture of other parts constituting for example the vehicle body such as the sides, the floors, the wings, the doors, the cross-member 40 connecting the rear trains as depicted in FIG. 4B.

FIG. 5 depicts an aircraft fuselage portion 5 comprising several fuselage parts 50 made of thermoplastic polymer composite, some of which comprise a layer 53 of (meth) acrylic thermoplastic polymer.

In addition, preferably, the object 1, 2, 3, 4, 5 made of thermoplastic polymer composite according to the invention does not comprise more than 50% by weight, more preferably not more than 40% by weight, more preferably not more than 30% by weight, advantageously not more than 20% by weight, more advantageously not more than 15% by weight and even more advantageously not more than 10% by weight of thermosetting polymers such as epoxy or polyester or polyurethane resins. Yet, hitherto, thermosetting polymers were generally used in the manufacture of objects 1 made of polymer composite. Likewise, preferably, the object 1 made of thermoplastic polymer composite according to the invention does not comprise more than 10% by weight, more preferably not more than 9% by weight and even more preferably not more than 8% by weight, advantageously not more than 7% by weight, more advantageously not more than 6% by weight and even more advantageously not more than 5% by weight of adhesives, preferably thermosetting adhesives. Indeed, the adhesive bonding of the different object parts made of polymer composite is generally carried out with thermosetting structural adhesive of epoxy resin type.

Preferably, the thermoplastic polymer composite of a part 10, 20, 30, 40, 50 according to the invention is at least partially covered with a layer of (meth)acrylic thermoplastic polymer at least 0.5 mm, preferably at least 1 mm, more preferably at least 2 mm, thick, for example on a surface intended to be welded. The polymer composite is more particularly covered with this layer of (meth)acrylic thermoplastic polymer at an assembly interface zone intended to form the future welded interface 12. This makes it possible in particular to avoid the appearance of zones with a lower concentration of thermoplastic polymer. Alternatively, the part 10, 20, 30, 40, 50 made of thermoplastic polymer composite may have at least one face covered with the layer of (meth)acrylic thermoplastic polymer.

Particularly advantageously, the object 1, 2, 3, 4, 5 made of polymer composite according to the invention comprises a welded interface 12, 22, 32, 42 having a length of greater than 1 meter, preferably greater than 5 meters.

In the context of the invention, the use of parts 10 made of thermoplastic polymer composite comprising a fibrous reinforcement and a (Meth)acrylic thermoplastic polymer matrix makes it possible to significantly reduce the amount of thermosetting polymer used in the objects 1, 2, 3, 4, 5 made of polymer composite and opens up possibilities that cannot be envisioned with thermosets, such as recycling of a majority of the object 1, 2, 3, 4, 5 made of thermoplastic polymer composite, and also easier assembly or repairs.

The invention claimed is:

1. A process for manufacturing an object made of a thermoplastic polymer composite from at least two parts made of (meth)acrylic thermoplastic polymer composite, said (meth)acrylic thermoplastic polymer composite comprising a fibrous reinforcement of long fibers having an aspect ratio of at least 7500 or continuous fibers and a thermoplastic polymer matrix, said process comprising the steps of:
   impregnation of a fibrous reinforcement with a liquid (meth)acrylic composition,
   polymerization of the liquid (meth)acrylic composition to manufacture the at least two parts made of (meth) acrylic thermoplastic polymer composite comprising the fibrous reinforcement and a (meth)acrylic thermoplastic polymer matrix,
   deposition of a layer of (meth)acrylic thermoplastic polymer at least at an assembly interface zone,
   arranging the two parts made of thermoplastic polymer composite adjacent or overlapping at said assembly interface zone, and
   heating to melt the thermoplastic polymer matrix at said assembly interface zone, so as to form an object made of thermoplastic polymer composite comprising a welded interface,
   wherein the thermoplastic polymer matrix is melted by a technique selected from the group consisting of: ultrasonic welding, induction welding, resistance wire welding, friction stir welding, laser welding, and heating by infrared or ultraviolet radiation, wherein at least one of the two parts made of thermoplastic polymer composite comprises the layer of (meth)acrylic thermoplastic polymer at least 0.5 mm thick on a surface intended to be welded, and wherein the (meth)acrylic thermoplastic polymer of the (meth)acrylic thermoplastic polymer composite and the layer of (meth)acrylic thermoplastic polymer has a glass transition temperature between 50° C. and 140° C. and the (meth)acrylic thermoplastic polymer or a portion of the (meth)acrylic thermoplastic polymer of the (meth)acrylic thermoplastic polymer composite and the layer of (meth)acrylic thermoplastic polymer has a melt flow index less than 20 g/10 min according to the standard ISO 1133.

2. The manufacturing process as claimed in claim 1, wherein the fibrous reinforcement comprises fibers selected from the group consisting of carbon fibers, glass fibers, basalt fibers, polymer-based fibers, plant fibers, and mixtures thereof.

3. The manufacturing process as claimed in claim 1, wherein the fibrous reinforcement is based on fibers having an aspect ratio of at least 10,000.

4. The manufacturing process as claimed in claim 1, wherein said process further comprises, after the heating step, a step of applying pressure at the interface in order to weld the at least two parts made of thermoplastic polymer composite together.

5. The manufacturing process as claimed in claim 1, wherein the (meth)acrylic thermoplastic polymer of the (meth)acrylic thermoplastic polymer composite and the (meth)acrylic thermoplastic polymer matrix is chosen from poly(methyl methacrylate) (PMMA), copolymers of methyl methacrylate (MMA), or mixtures thereof.

6. The manufacturing process as claimed in claim 1, wherein the (meth)acrylic thermoplastic polymer of the (meth)acrylic thermoplastic polymer composite and the (meth)acrylic thermoplastic polymer matrix has a glass transition temperature (Tg) of between 70° C. and 140° C.

7. The manufacturing process as claimed in claim 1, wherein the (meth)acrylic thermoplastic polymer matrix further comprises one or more additives or fillers.

8. The manufacturing process as claimed in claim 1, wherein the liquid (meth)acrylic composition comprises a (meth)acrylic monomer, a precursor (meth)acrylic polymer and a radical initiator.

9. The manufacturing process as claimed in claim 1, wherein the liquid (meth)acrylic composition comprises a (meth)acrylic monomer or a mixture of (meth)acrylic monomers, and a precursor (meth)acrylic polymer.

10. The manufacturing process as claimed in claim 9, wherein the (meth)acrylic monomer or the mixture of (meth)acrylic monomers in the liquid (meth)acrylic composition are present at an amount of at least 40% by weight in the liquid (meth)acrylic composition.

11. The manufacturing process as claimed in claim 8, wherein the precursor (meth)acrylic polymer in the liquid (meth)acrylic composition is present at an amount of at least 10% by weight in the liquid (meth)acrylic composition.

12. The manufacturing process as claimed in claim 8, wherein the precursor (meth)acrylic polymer in the liquid (meth)acrylic composition is present at an amount of at most 60% by weight in the liquid (meth)acrylic composition.

13. The manufacturing process as claimed in claim 8, wherein the liquid (meth)acrylic composition, comprises:
   a) the (meth)acrylic monomer in proportions of between 40% and 90% based on the weight of the (meth)acrylic monomer and the (meth)acrylic polymer
   b) the (meth)acrylic polymer in proportions of between 10% and 60% based on the weight of the (meth)acrylic monomer and the (meth)acrylic polymer.

14. The manufacturing process as claimed in claim 1, wherein the parts made of thermoplastic polymer composite are manufactured at a temperature of less than 150° C.

15. The manufacturing process as claimed in claim 1, wherein the parts made of thermoplastic polymer composite are manufactured by injection molding, infusion molding, or by molding pre-impregnated strips.

16. The manufacturing process as claimed in claim 1, the layer of (meth)acrylic thermoplastic polymer is at least 1.0 mm thick on the surface intended to be welded.

17. The manufacturing process as claimed in claim 1, wherein during the heating step, the temperature at the welded interface is between 160° C. and 300° C.

18. The manufacturing process as claimed in claim 1, wherein the thermoplastic polymer matrix is melted by resistance wire welding.

19. The manufacturing process as claimed in claim 1, wherein at least one of the two parts made of thermoplastic polymer composite comprises at least one resistive filament located at the assembly interface zone.

* * * * *